(12) United States Patent
DiTullio et al.

(10) Patent No.: US 11,645,196 B2
(45) Date of Patent: *May 9, 2023

(54) DYNAMIC MANAGEMENT AND CONTROL OF TEST FEATURES IN NATIVE APPLICATIONS

(71) Applicant: Apptimize LLC, San Francisco, CA (US)

(72) Inventors: Jeff DiTullio, Menlo Park, CA (US); Nancy Hua, Mountain View, CA (US); Lisa Jakobovits, San Francisco, CA (US)

(73) Assignee: Apptimize LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,714

(22) Filed: Jun. 9, 2021

(65) Prior Publication Data
US 2021/0303455 A1 Sep. 30, 2021

Related U.S. Application Data

(63) Continuation of application No. 15/292,980, filed on Oct. 13, 2016, now Pat. No. 11,086,771.

(60) Provisional application No. 62/240,945, filed on Oct. 13, 2015.

(51) Int. Cl.
G06F 11/36 (2006.01)

(52) U.S. Cl.
CPC ........ *G06F 11/3696* (2013.01); *G06F 11/362* (2013.01)

(58) Field of Classification Search
CPC .......................... G06F 11/362; G06F 11/3696
See application file for complete search history.

(56) References Cited

U.S. PATENT DOCUMENTS

| 6,023,721 | A | 2/2000 | Cummings |
| 8,468,516 | B1 | 6/2013 | Chen et al. |
| 8,997,081 | B1 | 3/2015 | Manion et al. |
| 2014/0019953 | A1* | 1/2014 | Kolesnikov ............... G06F 8/61 717/170 |
| 2014/0068273 | A1 | 3/2014 | Sobel et al. |
| 2015/0281387 | A1* | 10/2015 | Barreto ................... H04W 4/50 709/203 |

(Continued)

OTHER PUBLICATIONS

Fowler, M., "FeatureToggle", 2010 [retriecved on Nov. 21, 2020], dowloaded from the Wayback Maching Internet Archive at <url>: https://web.archive.org/web/20101031180154/https://martinfowler.com/bliki/FeatureToggle.html.

(Continued)

*Primary Examiner* — S. Sough
*Assistant Examiner* — Stephen D Berman
(74) *Attorney, Agent, or Firm* — Fenwick & West LLP

(57) ABSTRACT

Techniques are described herein for enhancing software application development and software design-for-test (DFT) technology by facilitating dynamic management and control of embedded dynamic test features via an application development and optimization platform. In some embodiments, an application development and optimization platform is described that can track, manage and rollout features of native mobile applications without the need to wait for public app store releases.

20 Claims, 14 Drawing Sheets

(56) References Cited

U.S. PATENT DOCUMENTS

| | | |
|---|---|---|
| 2015/0378880 A1* | 12/2015 | Kucharski .......... G06F 11/3612 717/130 |
| 2016/0063282 A1 | 3/2016 | Shani et al. |
| 2016/0080523 A1 | 3/2016 | Sethi et al. |
| 2016/0124839 A1 | 5/2016 | Mordo et al. |
| 2016/0179502 A1 | 6/2016 | Cawley |
| 2017/0017562 A1 | 1/2017 | Gulkis et al. |

OTHER PUBLICATIONS

Neely, S. et al., "Continuous Delivery? Easy! Just Change Everything (well, maybe it is not that easy)," 2013 [retrieved on Nov. 21, 2020], 2013 Agile Conference, pp. 121-128.
United States Office Action, U.S. Appl. No. 15/292,980, filed Nov. 30, 2020, 23 pages.
United States Office Action, U.S. Appl. No. 15/292,980, filed Mar. 20, 2020, 21 pages.
United States Office Action, U.S. Appl. No. 15/292,980, filed Feb. 21, 2019, 18 pages.

* cited by examiner

FIG. 6A

DYNAMIC MANAGEMENT AND CONTROL OF TEST FEATURES IN NATIVE APPLICATIONS

CROSS-REFERENCE TO RELATED APPLICATIONS

This application is a continuation of U.S. application No. U.S. Ser. No. 15/292,980, titled "DYNAMIC MANAGEMENT AND CONTROL OF TEST FEATURES IN NATIVE APPLICATIONS" filed on Oct. 13, 2016, which claims benefit of Provisional Patent Application Ser. No. 62/240,945 titled "FEATURE FLAGGING AND STAGED ROLLOUT" filed on Oct. 13, 2015, which are hereby incorporated by reference in their entirety.

TECHNICAL FIELD

Aspects of the disclosure are related to computing hardware and software technology for application testing and design for test technology, and more specifically, to enhanced software development platforms for dynamic management and control of test features in native applications deployed via public application ("app") stores.

Overview

Examples discussed herein relate to dynamic management and control of test features in native applications. In an implementation, a computing apparatus is disclosed. The computing apparatus includes one or more computer-readable storage media, a processing system operatively coupled with the one or more computer readable storage media, and a native application. The native application is deployed onto the computing apparatus via a public app store and is stored on the one or more computer readable storage media. The native application includes an embedded control module or software development kit (SDK) comprising program instructions that, when executed by the processing system, direct the processing system to process a manifest provided by an application development and optimization platform to extract at least one test feature configured to modify a default feature of the native application, monitor execution of program instructions associated with the native application for occurrence of an event that triggers a default feature of the native application, and responsive to the event, replace the default feature with the test feature.

In another implementation, an application development and optimization platform is disclosed. The application development and optimization platform includes a processing system and one or more computer readable storage media. The one or more computer readable storage media have program instructions stored thereon which, when executed by the processing system, direct the processing system to provide a SDK to an application developer for development of an application to be deployed via a public application store, and receive input, via a feature dashboard, identifying changes to one or more test features of the application. The program instructions further direct the processing system to monitor feedback information from deployments of the application to user base computing apparatuses, process the feedback information to identify a subset of the user base computing apparatuses, and roll out the one or more test features to the identified user base computing apparatuses.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter

TECHNICAL BACKGROUND

In the fields of computer hardware and software technology, application ("app") developers commonly use test features such as, for example, alphmbeta (A/B) testing, staged rollouts and feature toggling to test various features on subsets of their user base. For example, feature flagging (also known as feature toggling) is a technique whereby a new area of code or feature is compartmentalized so that the developer can easily turn it on or off without affecting the rest of the product or service. The feature toggling techniques enable developers to push out partially tested code so that the code can be shut off quickly and without a new build release if any problems are detected. Once a feature is behind a flag, you can expose it to a subset of users, e.g., a small percentage of users, to make sure a feature works as planned and subsequently push the feature out to the remaining users gradually. Staged rollout is another testing technique (also referred to as "slow rollout" or "phased rollout"), which includes the practice of pushing out a feature gradually.

Unfortunately, some major public application stores do not support the use of these test features. For example, Apple's App Store™ requires a lengthy, and often time consuming, approval process each time a new (or updated version) of an app is uploaded for distribution. Consequently, in these app store environments there is currently not an efficient way to target and track a specific subsets of users to make sure features work as expected. Furthermore, even if there were a way to target a specific subset of users for the feature, the users can decline new (or updated versions) of an application further complicating testing scenarios.

Overall, the examples herein of some prior or related systems and their associated limitations are intended to be illustrative and not exclusive. Upon reading the following, other limitations of existing or prior systems will become apparent to those of skill in the art.

Overview

Provided herein are systems, methods, and software that enhance application development and software design-for-test (DFT) technology by facilitating dynamic management and control of embedded dynamic test features via an application development and optimization platform.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIGS. 6A-6G illustrate various example graphical user interfaces that can be provided to application developers to facilitate development of embedded test features.

TECHNICAL DISCLOSURE

Figure 1A:
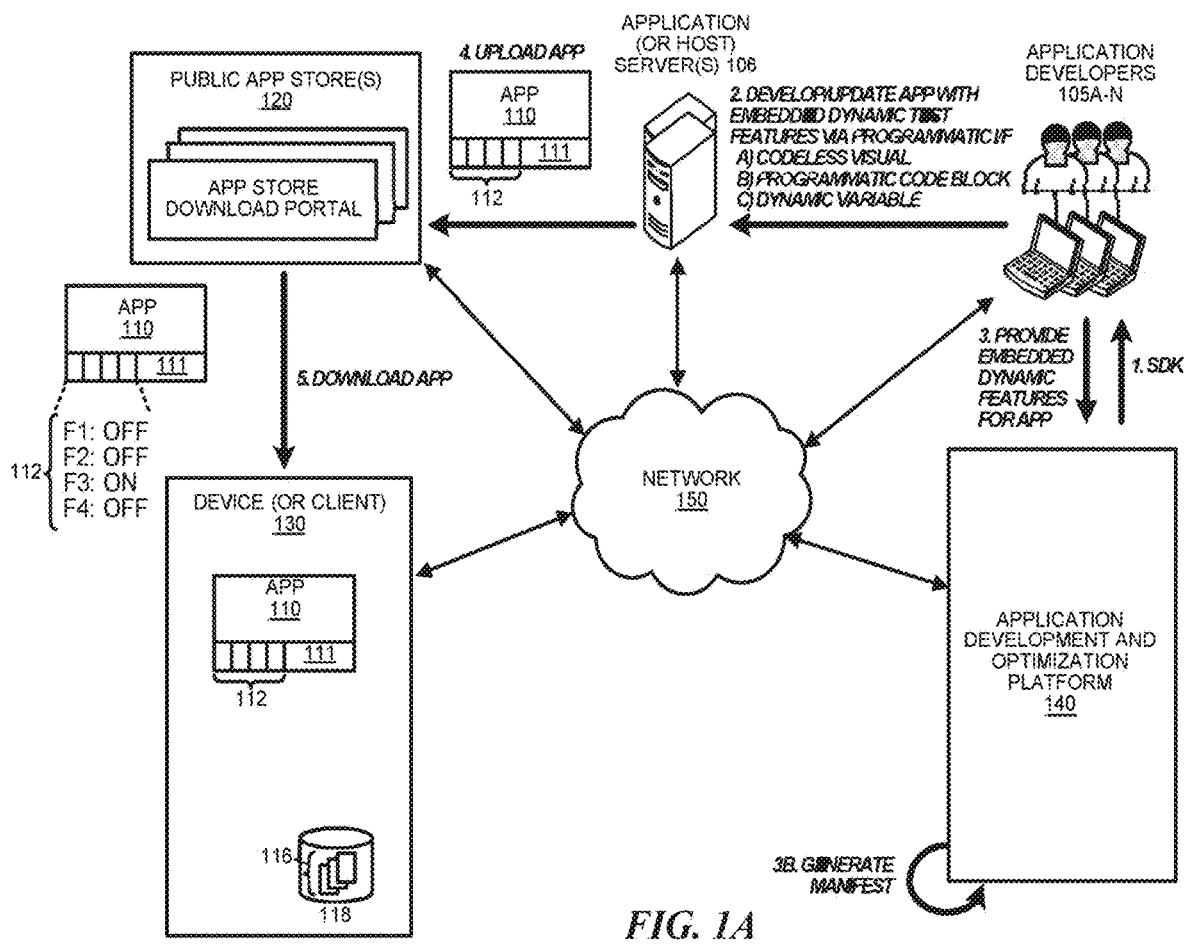
FIGS. 1A-1C illustrate an example environment and various associated scenarios for facilitating application development and design-for-test technology using an application development and optimization platform.

Techniques are described herein for enhancing software application development and software design-for-test (DFT) technology by facilitating dynamic management and control of embedded dynamic test features via an application development and optimization platform. Specifically, the application development and optimization platform can track, manage and rollout features of native mobile applications without the need to wait for public app store releases.

The technology described herein can accomplish these techniques by leveraging various embedded dynamic test features such as, for example, dynamic variables and/or code blocks, or other similar programmatic dynamic test features. App developers can build and release a feature to app stores that is turned off by default. The app developer can subsequently incrementally roll the feature out to the app user base via an application development and optimization platform including a feature flagging dashboard. As discussed above, developers typically perform a limited rollout to test performance, usability, etc., before pushing the feature out to the entire user base of the app.

In some embodiments, the technology described herein can push a new (or updated version) of an app out without uploading the app to the public app store. As discussed herein, the public app store is essentially bypassed allowing app developers to control staged rollouts, A/B testing, and enabling/disabling of features (feature toggling). As discussed herein, changes (e.g., images, copy, colors, calls to action, layout instantly, etc.) can be pushed out immediately without the need for additional coding or tagging, and without the need to wait for App/Play Store approvals. The techniques described herein minimize the burden on application developers and speed up app development cycles.

In some embodiments, the technology described herein facilitates robust A/B testing minimizing the burden on developers while allowing them to segment and target specific users and experiment with simple user interface (UI) changes, complex flows, features, etc. As discussed herein, the application development and optimization platform can track the changes and provide the application developers with clear, actionable analytics.

In some embodiments, the application development and optimization platform provides a feature flagging dashboard which includes a list of features that can be turned on or off for specific versions of the app.

In some embodiments, the application development and optimization platform provides application developers with the ability to rollout a feature based on specific parameters. For example, the parameters can include, but are not limited to, percentage of users, a total number of users, user identifiers (UIDs), user email addresses, etc.

In some embodiments, the application development and optimization platform provides application developers with the ability to provide notes on feature/app-version combo.

In some embodiments, the application development and optimization platform provides application developers with the ability to mark and/or otherwise indicate bad feature/app version combinations that should not be rolled out. For example, if there is a bug in a feature delivered with a particular version of an app (e.g., version 2.2 of an app), then an application developer can indicate that the feature should not be enabled even when the feature is otherwise rolled out and enabled on all other versions of the app.

In some embodiments, the application development and optimization platform provides application developers with the ability to monitor and/or otherwise track historical performance of changes. The information can be processed to generate various visualization that provide the application developers with relevant information regarding the changes. For example, the application development and optimization platform can provide a roll out history graph, which visually provides the application developers with relevant information over a period of time. The roll out history graph can, for example, visually indicate all users, users having a particular version of the app with a particular feature, and users with particular version of the app with and the particular feature enabled.

In some embodiments, the application development and optimization platform provides advanced user targeting features to the application developers. For example, the application developers can control to which users particular features are rolled out based on configurable targeting parameters. For example, the application development and optimization platform might roll out a feature only to users that match the targeting parameters (e.g., OS version, device version, etc.) configured by the application developer.

In some embodiments, the application development and optimization platform provides application developers with the ability to enter particular metrics (e.g., goals or retention numbers). The application development and optimization platform can provide and/or otherwise display, for example, data on how the app is performing when the feature is turned off versus when the feature is turned on. The metrics can include but are not limited to retention, engagement, customer events, customer event funnels.

In some embodiments, the application development and optimization platform provides application enabling by email functionality. The enabling by email functionality provides developers with the ability to turn on a feature by, for example, adding a targeted user's email address to an enable list and/or otherwise enter the targeted user's email into the system The application development and optimization platform allows for this functionality even if the app is not collecting email by sending the user an email with a native hyper link (e.g., deeplink or deferred deeplink) that links the app installed on the user's mobile device to the email such that the system can enable the feature when the user activates or otherwise clicks the deeplink.

In some embodiments, the application development and optimization platform can track when (e.g., on which version) a feature flag is added to an app and when it gets removed (e.g., either permanently accepted/rejected and/or hardcoded into the app).

Figure 1B:
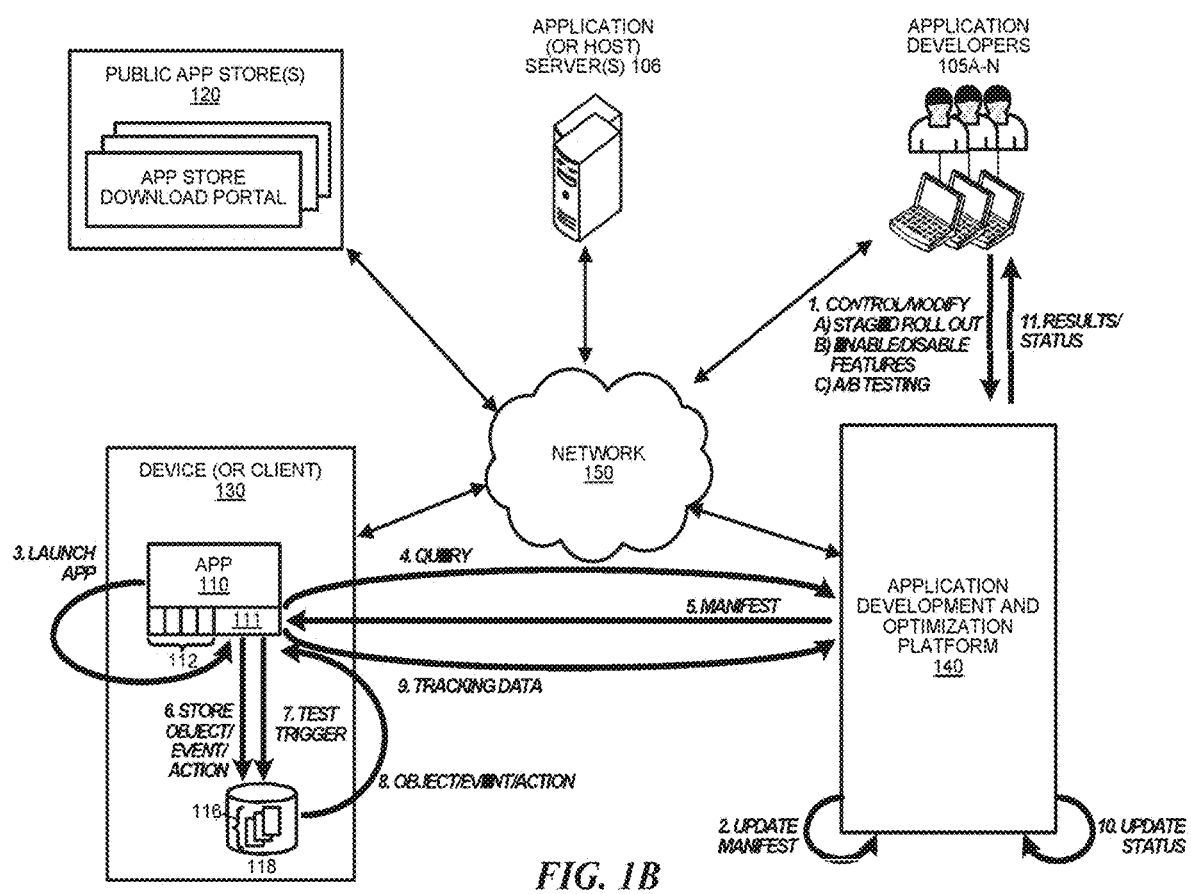
Figure 1C:
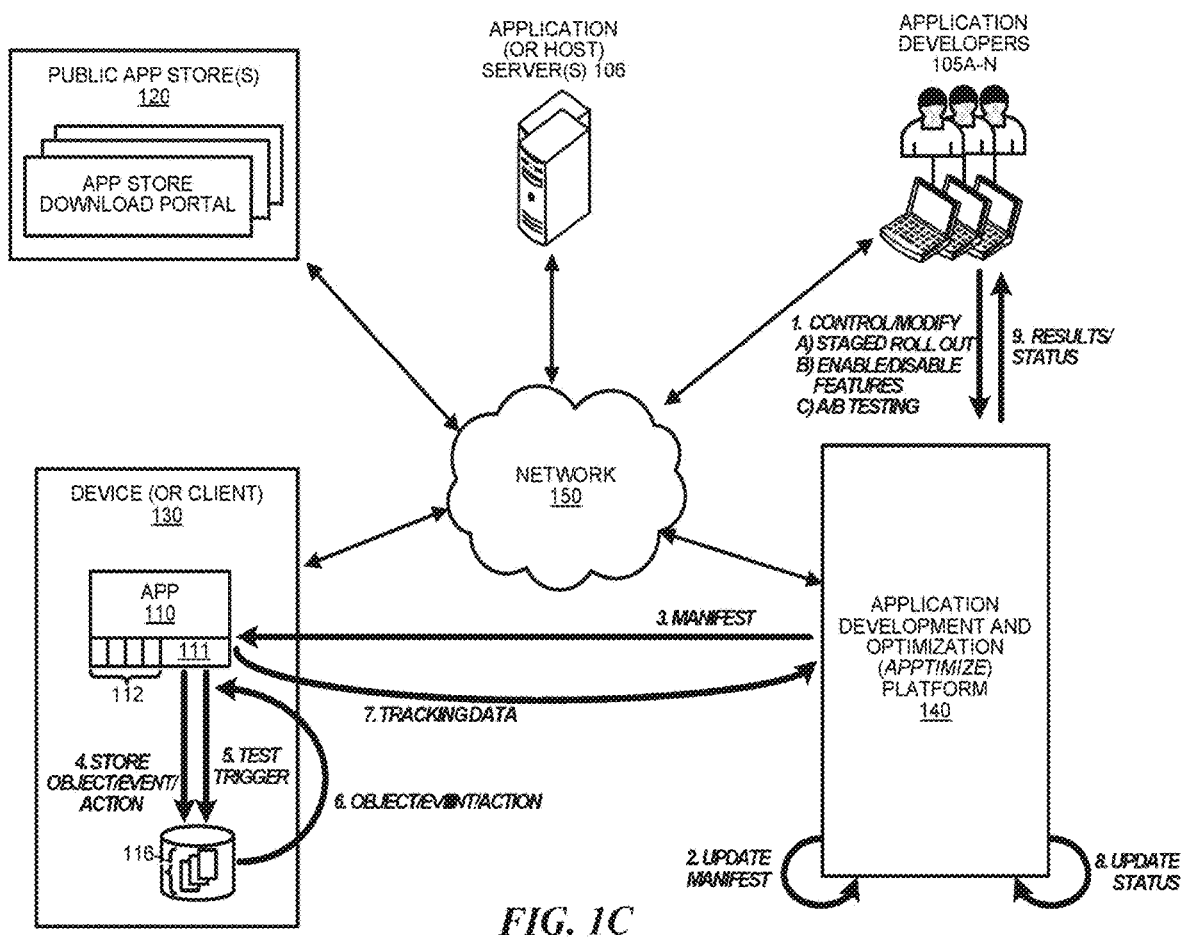

FIGS. 1A-1C illustrate an example environment 100 and various associated scenarios for facilitating application development and design-for-test technology using an application development and optimization platform. More specifically, the application development and optimization platform facilities dynamic management and control of embedded dynamic test features via a cloud-based application development and optimization platform.

As shown in the example of FIGS. 1A-1C, the example environment 100 includes one or more application developer's 105A-N, one or more application (or host) servers 106, an app 110, public app store(s) 120, a device (or client) 130, and an application development and optimization platform 140 (e.g., Apptimize platform). A single device 130 is shown for simplicity, it is appreciated that the example environment 100 can include any number of devices 130.

The application development and optimization platform 140 can track, manage and rollout features in native mobile applications without waiting for public store releases. More specifically, by leveraging various embedded dynamic test features such as, for example, dynamic variables and/or code blocks, or other similar programmatic dynamic test features, app developers 105A-N can build and release a feature to app stores that is turned off by default. The app developer can subsequently slowly roll out the feature to the app user base via an application development and optimization platform including a feature flagging dashboard. As discussed above, developers typically perform a limited rollout to test performance, usability, etc., before pushing the feature out to the entire user base of the app.

The network 150 may be a telephonic network, an open network, such as the Internet, a private network, such as an intranet and/or the extranet, or combinations or variations thereof. For example, the Internet can provide file transfer, remote log in, email, news, RSS, and other services through any known or convenient protocol, such as, but not limited to, the TCP/IP protocol, Open System Interconnections (OSI), FTP, UPnP, iSCSI, NSF, ISDN, PDH, RS-232, SDH, SONET, etc. The network 150 can be any collection of distinct networks operating wholly or partially in conjunction to provide connectivity to the one or more application developer's 105A-N, one or more application (or host) servers 106, the public app store(s) 120, device(s) 130, and the application development and optimization platform 140. The communications can be achieved, for example, by an open network such as the Internet, a private network, such as an intranet and/or extranet.

In some embodiments, communications can be achieved via one or more secure communications protocols, such as secure sockets layer (SSL) or transport layer security (TLS). In addition, communications can be achieved via one or more wireless networks, such as, but not limited to, one or more of a Local Area Network (LAN), Wireless Local Area Network (WLAN), a Personal Area Network (PAN), a Campus Area Network (CAN), a Metropolitan Area Network (MAN), a Wide Area Network (WAN), a Wireless Wide Area Network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G networks, Enhanced Data rates for GSM Evolution (EDGE), General Packet Radio Service (GPRS), enhanced GPRS, messaging protocols such as TCP/IP, SMS, MMS, Extensible Messaging and Presence Protocol (XMPP), Real Time Messaging Protocol (RTMP), Instant Messaging and Presence Protocol (IMPP), instant messaging, USSD, IRC, or any other wireless data networks or messaging protocols.

Referring first to FIG. 1A, an example scenario is shown in which one or more application developers 105A-N develop and/or update an app 110 to include embedded test features. The app 110 includes a control module 111 and one or more embedded dynamic test features 112. The embedded dynamic test features 112 can include codeless visual testing, programmatic code block testing, dynamic variable testing, etc.

App developers 105A-N can build and release a test feature to app stores that is turned off by default. The app developer 105A-N can subsequently slowly roll out the feature to the app user base via an application development and optimization platform including a feature flagging dashboard. As discussed above, the app developers 105A-N typically perform a limited rollout to test performance, usability, etc., before pushing the feature out to the entire user base of the app.

The embedded test features 112 can be compartmentalized so that a developer can easily turn features on or off without affecting the rest of the product. This technique enables developers to push out semi-tested code in a way where the code can be shut off quickly without a new build release if any problems are detected. Likewise, the embedded dynamic test features 112 allow for staged rollout. Once a feature is behind a flag, the application developer can then expose it to a small percentage of users only, make sure the feature works as planned, and then gradually push it out to all your users.

In the example scenario of FIG. 1A, an application developer 105 first downloads (step 1) a software development kit (SDK). The SDK provides one or more interfaces that allow the application developer 105 to generate and embed (step 2) the dynamic test features 112 as well as a control module 111. As discussed herein, the dynamic test features can include a codeless visual test, a programmatic code block test, a dynamic variable test, or other types of dynamic test features including combinations or variations thereof. The codeless visual test can be generated using a visual or graphical editor that facilities user interface (UI) changes in real-time. For example, an application developer can generate a codeless visual test to make UI changes (such as editing text, colors, or images) or experiment between app releases. The programmatic code block test is a flexible, code-based way to make any type of change to the app. The programmatic code block test is typically used for more complex changes to flow and non-UI edits. The programmatic code block test can be generated using a programmatic code block interface. The dynamic variable test can be generated using a Dynamic Variables Interface. Dynamic variable tests are a fast way to make changes instantly to any variables in an app via a dashboard of the application development and optimization platform. The variable changes are possible after a simple, initial programmatic tagging of variables. Use Dynamic Variables for iterating on variable values between app releases, like table copy, which image or layout to show, and logic settings.

Once generated, the dynamic test features or information concerning the dynamic test features are sent (step 3) to the application development and optimization platform 140. The app can be developed on one or more host server(s) 106 where it is uploaded to the public app store 120 (step 4) for verification and distribution to client 130. Once verified, the app (or updated app in the case of a new version) is available for download (or pushed out via update) to device 130 (step 5). As shown in the example of FIG. 1A, the app 110 includes various features that are flagged or behind a flag. Features F1-F4 are included and/or otherwise embedded in the app 110. Each of the features is turned off by default except F3, which is turned on by default.

FIGS. 1B and 1C illustrate example scenarios depicting various operations of the application development and optimization platform 140 for rollout of a new (or updated version) of an app without uploading the app to the public app store(s) 120. Additionally, the example scenarios illustrate the various feature tracking and management features of the application development and optimization platform 140. More specifically, in the examples of FIGS. 1B and 1C, an application developer 105 modifies one or more of the embedded test features 112 by way of the application development and optimization platform 140 without uploading the app to the public app store(s) 120.

The application development and optimization platform 140 allows app developers 105 to granularly control push out of staged rollouts, A/B testing, and enabling/disabling of features (feature toggling). As discussed herein, changes (e.g., images, copy, colors, calls to action, layout instantly, etc.) can be pushed out immediately without the need for coding or tagging, and without the need to wait for App Store™ or Play Store™ approvals. These techniques minimize the burden on application developers and speed up app development cycles.

In some embodiments, a manifest is used to convey information to the device 130 about the changes, e.g., enabling/disabling of features, etc. FIGS. 1B and 1C illustrate various examples of providing a manifest to a device 130. More specifically, FIG. 1B illustrates pulling of a manifest by a device 130 and FIG. 1C illustrates pushing the manifest. The manifest can include instructions to enable/disable features, instructions to replace objects with different objects upon occurrence of an action or event, etc. As will be discussed in greater detail below, in some instances the manifest can include an object or data that is to replace an existing object upon occurrence of the action or event.

Referring first to the example scenario of FIG. 1B, an application developer 105 provides one or more control or modification instructions, e.g., modification of one or more of the embedded test features 112. For example, the application developer 105 can enable particular features for particular devices or users (step 1). Alternatively or additionally, the application developer 105 can provide one or more new objects, events or actions with which to replace existing objects, events or actions on a device. The application development and optimization platform 140 processes the modification instruction(s) and updates the corresponding manifest (step 2). The app 110 is launched (or executed) on device 130 (step 3). The control module 111 then queries the application development and optimization platform 140 for the latest manifest (step 4). For example, the query can be communicated responsive to launching or executing the app 110. The application development and optimization platform 140 responsively sends the manifest (or updated manifest) to the client 130 (step 5).

The control module 111 receives and processes the manifest and optionally stores any objects, events or actions 116 in a local data store 118 (step 6). As discussed above, in some embodiments the manifest can include object data that is to replace an existing object upon occurrence of an action or event. When the test trigger occurs (step 7), the control module 111 accesses the data store to retrieve the object to replace an existing object (step 8). Alternatively, in some instances, the manifest can simply enable or disable features or code blocks of the embedded test features 112. In such cases, the control module 111 can process the manifest and enable or disable the features immediately, e.g., without waiting for a test trigger.

The device 130 can track feature data associated with embedded test features 112 and provide the feature data to the application development and optimization platform 140 (step 9). The feature data can be provided upon request, periodically, upon occurrence of specific events, or in any other manner. Once received, the application development and optimization platform 140 processes the feature data and updates status information associated with the app/feature (step 10). As discussed herein, the status information can include generation of charts/graphs, real-time analysis of performance, etc. The application developers 105 can monitor the results or status information associated with the feature data (step 11).

FIG. 1C illustrates another example of providing a manifest to a device 130. The example of FIG. 1C is generally self-explanatory and similar to the example of FIG. 1B except that FIG. 1C illustrates pushing the manifest responsive to detecting updates to the manifest as opposed to waiting from a query from the device 130. It is appreciated that the application development and optimization platform could alternatively or additionally push the manifest out to devices (or clients) based on a trigger or some other condition.

Figure 2:
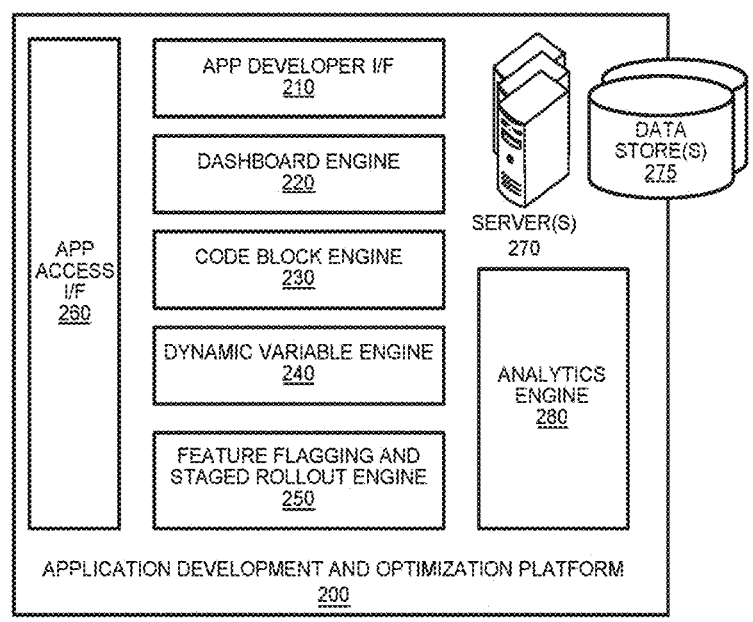
FIG. 2 illustrates example components of an application development and optimization platform including a feature flagging and staged rollout engine.

FIG. 2 illustrates example components of an application development and optimization platform 200 including a feature flagging and staged rollout engine 250. The application development and optimization platform 200 can be the application development and optimization platform 140 of FIG. 1, although alternative configurations are possible.

As illustrated in the example of FIG. 2, the application development and optimization platform 200 includes an app developer interface 210, a visual dashboard engine 220, a code block engine 230, a dynamic variable engine 240, the feature flagging and staged rollout engine 250, an app access interface 260, one or more servers 270 and one or more data stores 275, and an analytics engine 280. Some or all of the components can be omitted in some embodiments. Additional components are also possible.

In some embodiments, among other features, the application and development platform, e.g., application and development platform 200 of FIG. 2, provides a SDK to an application developer for development of an application to be deployed via a public application store. The application and development platform subsequently receives input, via a feature dashboard (or app developer interface 210). Various example screenshots of the app developer interface 210 are shown and discussed in greater detail with reference to FIGS. 6A-6G.

In some embodiments, the dashboard engine 220 and/or the analytics engine 280 processes the input to identify changes to one or more dynamic test features of the application as discussed herein. The various engines can monitor feedback information received from deployments of the application to a user base (e.g., computer apparatuses of the user base), process the feedback information to identify a subset of the user base to which to deploy the changed or updated feature, and roll out the one or more test features to the identified user base computing apparatuses. The application and development platform 200 then monitors the changed or updated features and can process and provide this information to developers. In this manner, developers can test, manage and track changes to features without requiring public app store updates.

Figure 3:
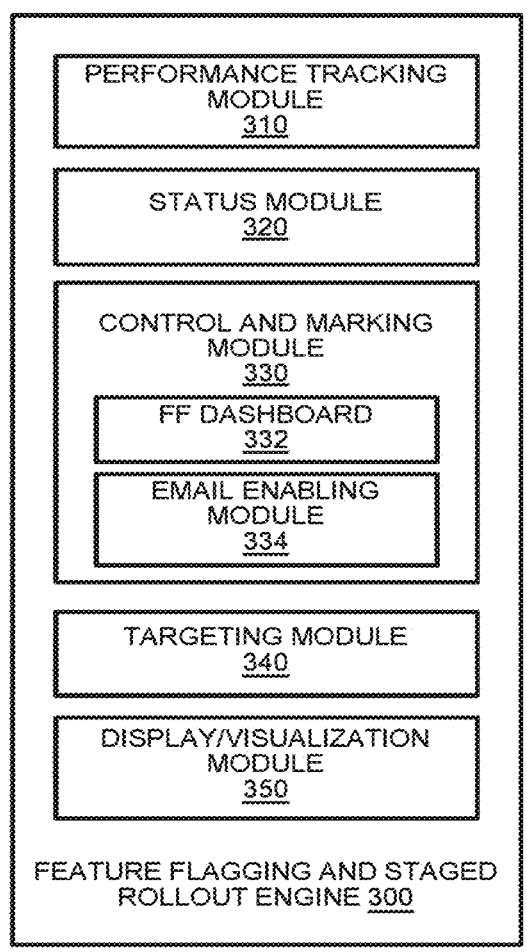
FIG. 3 illustrates example components of a feature flagging and staged rollout engine.

FIG. 3 illustrates example components of a feature flagging and staged rollout engine 300. The feature flagging and staged rollout engine 300 can be the feature flagging and staged rollout engine 250 of FIG. 2, although alternative configurations are possible.

As illustrated in the example of FIG. 3, feature flagging and staged rollout engine 300 includes a performance tracking module 310, a status module 320, a control and marking module 330 having a feature flagging (FF) dashboard 332 and an email enabling module 334, a targeting module 340, and a display/visualization module 350. Some or all of the components can be omitted in some embodiments. Additional components are also possible.

Figure 4:
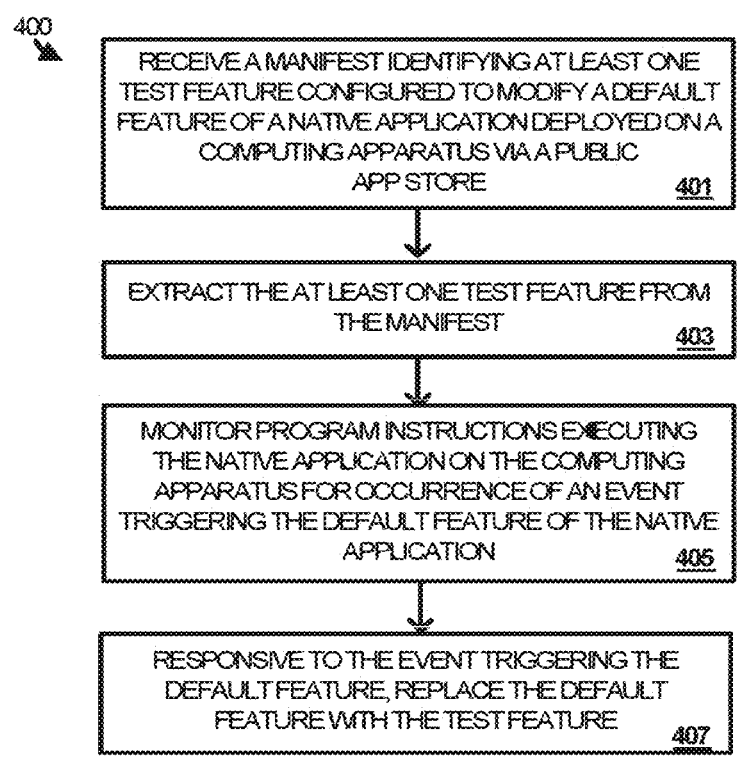
FIG. 4 depicts a flow diagram illustrating an example operational scenario for dynamically managing and controlling test features in native applications on a computing apparatus.

FIG. 4 depicts a flow diagram illustrating an example operational scenario 400 for dynamically managing and controlling test features in native applications on a computing apparatus, according to some embodiments. The example operations 400 may be performed in various embodiments by a control module or SDK embedded in the native application prior to deployment via a public app store such as, for example, control module 111 of FIGS. 1A-1C, or one or more processors, modules, engines, components or tools of the app 110.

To begin, at 401, the control module receives a manifest provided by an application development and optimization platform. As discussed herein, the manifest identifies at least one test feature configured to modify a default feature of a native application deployed on the computing apparatus via a public app store. Next, at 403, the control module extracts the at least one test feature from the manifest.

At 405, the control module monitors program instructions executing the native application on the computing apparatus for occurrence of an event triggering the default feature of the native application. The monitoring techniques may include use of enhanced code callback technology which is discussed in U.S. patent application Ser. No. 14/945,938, which is included by reference in its entirety herein. Lastly, at 407, the control module, responsive to the event triggering the default feature, replaces the default feature with the test feature.

Advantageously, the control module can receive and insert features into the deployed application via monitoring execution of the applications program instructions, e.g., object code, and replacing code blocks, objects, user interfaces, etc., with changed code blocks, objects, user interfaces, etc. In this manner, operation of the application can be modified without deploying a new version via the public app store and without modifying the object code of the deployed application. Furthermore, the control module can monitor feedback and/or otherwise track how the changes are received by the user base and provide the tracking data to the application and development optimization platform. The development optimization platform can process the tracking data and provide usable results/statuses to the application developers via one or more graphical interfaces (see, e.g., FIGS. 6A-6G) allowing for real-time or near real-time dynamic feature deployments and tracking.

Figure 5:
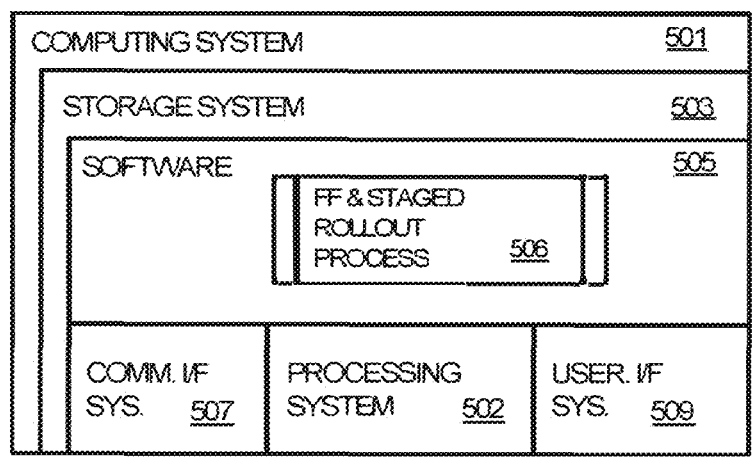
FIG. 5 illustrates a computing system suitable for implementing any of the architectures, components, applications, services, processes, and operational scenarios disclosed herein with respect to FIGS. 1-3 and discussed below in the Technical Disclosure.

FIG. 5 illustrates a computing system suitable for implementing any of the architectures, components, applications, services, processes, and operational scenarios disclosed herein with respect to FIGS. 1-4 and discussed below in the Technical Disclosure. FIG. 5 illustrates computing system 501 that is representative of any system or collection of systems in which the various operational architectures, scenarios, and processes disclosed herein may be implemented.

Examples of computing system 501 include, but are not limited to, smart phones, laptop computers, tablet computers, desktop computers, hybrid computers, gaming machines, virtual machines, smart televisions, smart watches and other wearable devices, as well as any variation or combination thereof. In other examples, other types of computers may be involved in the processes, including server computers, rack servers, web servers, cloud computing platforms, and data center equipment, as well as any other type of physical or virtual server machine, and any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes at least feature flag (FF) and staged roll out process 506, which is representative of the processes embodied in operational scenarios discussed herein. When executed by processing system 502 to enhance callback operations, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced callback operations and related functionality.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include callback process 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced callback operations. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

It may be understood that computing system 501 is generally intended to represent a computing system or systems on which software 505 may be deployed and executed in order to implement enhanced callback operations. However, computing system 501 may also be suitable as any computing system on which software 505 may be staged and from where it may be distributed, transported, downloaded, or otherwise provided to yet another computing system for deployment and execution, or yet additional distribution.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the examples described herein in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

FIGS. 6A-6G illustrate various example graphical user interfaces that can be provided to application developers to facilitate development of embedded test features. The graphical user interfaces shown in FIGS. 6A-6G are generally self-explanatory, but are briefly discussed below.

Figure 6A:
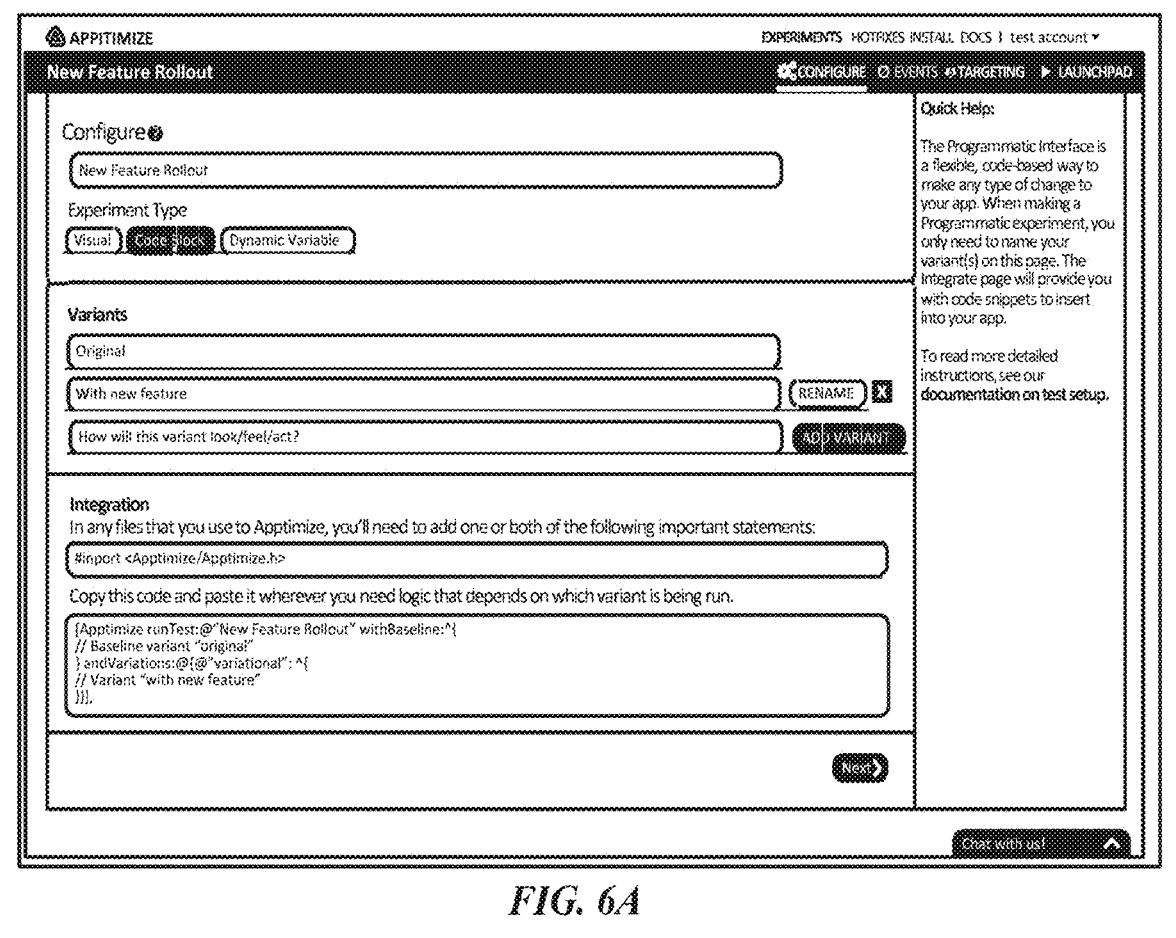

FIG. 6A illustrates an example graphical user interface that is provided to application developers to set up dynamic variables for feature flagging or staged rollout. Application developers can use a programmatic interface to set up a feature flag (e.g., using dynamic Variable). An application developer can create a new dynamic variable in the code of an app and use its value to, for example, show or hide the feature (e.g., enable or disable). Likewise, an application developer can create code block with a variant that controls a particular feature and cut and paste the code snippet into the app code.

Figure 6B:
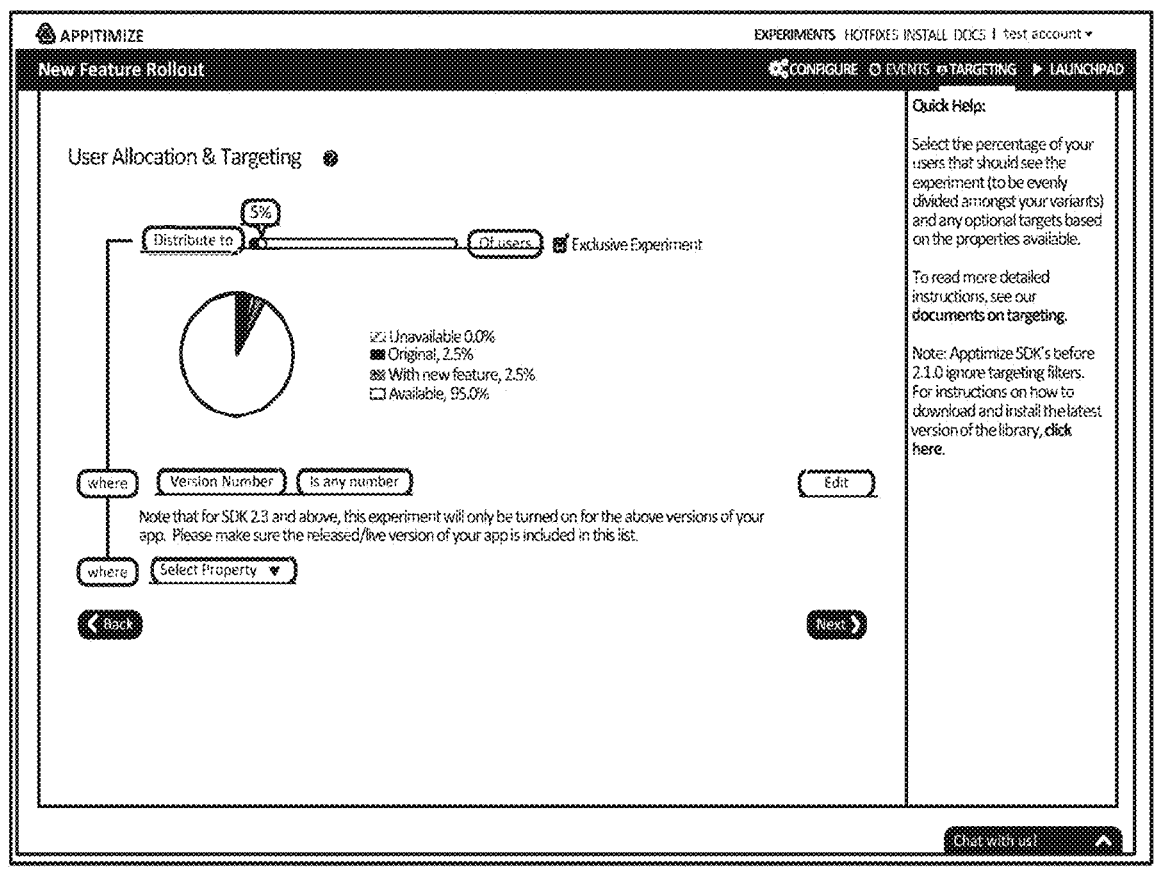

FIG. 6B illustrates an example graphical user interface that is provided to application developers to target devices or users of devices for feature flagging or staged rollout. More specifically, on an Events page, application developers can set up the events that to track. The tracking allows the developers to determine how the users are responding to the new feature compared to the app without the feature.

In some embodiments a percentage of users can be selected. For example, on a Targeting page, developers can allocate a small percentage of the users of the app to this "experiment." In the image shown in FIG. 6B, 5% of the users have been selected. This means that 2.5% of my users will see the original app (without the new feature), and 2.5% of my users will see the variant (app with the new feature).

In some embodiments, when a developer clicks on next to move onto the Launchpad page and use Advanced Verify. After launching the experiment, a developer can monitor to see the percentage of the users that interact with the new feature. If there are no bugs reported and the feature looks good, the developer can dial up the users allocated on the Targeting page.

Figure 6C:
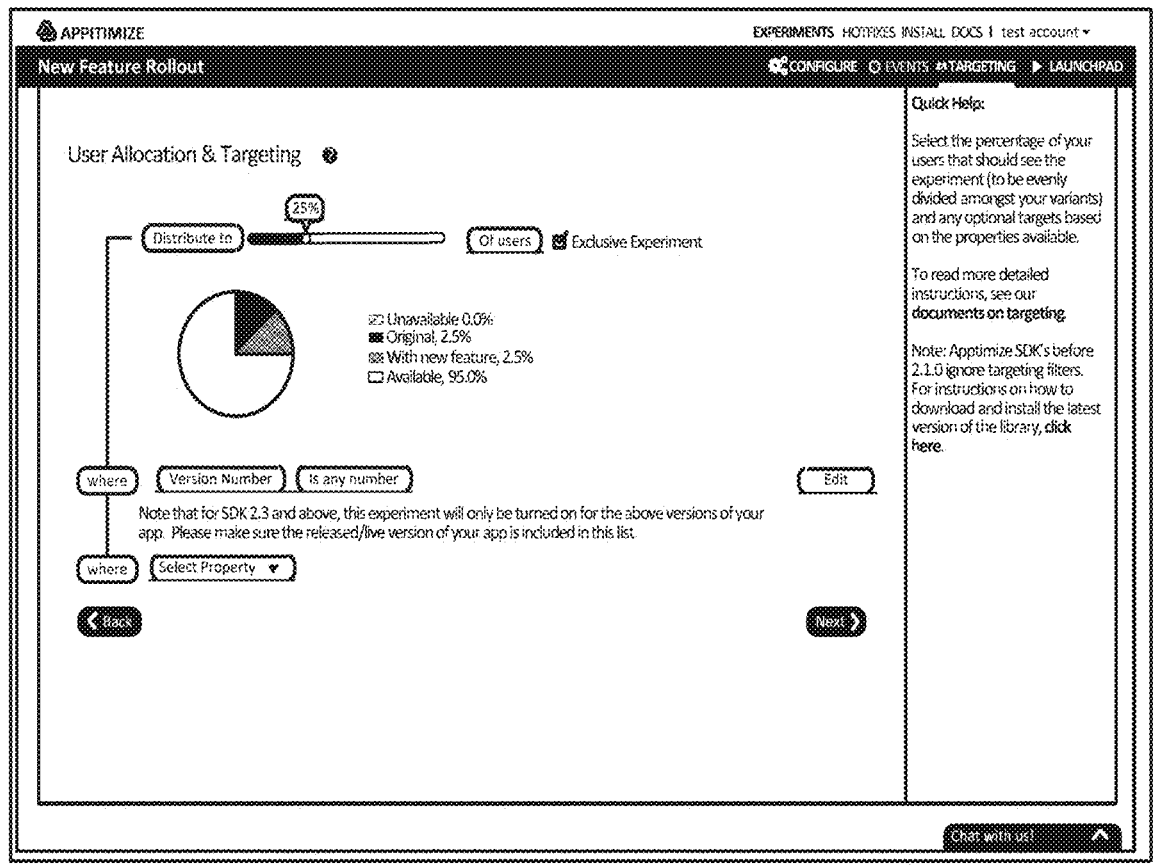

FIG. 6C illustrates an example graphical user interface that is provided to application developers check that the feature is working as it should. More specifically, in the example interface of FIG. 6C, the allocated users selection is dialed up to 25%. This means that 12.5% of the users are now seeing the new feature. When the developer clicks "Save," a popup modal asks to confirm that I want to reset the users and launch the experiment. This is a safety check since the changes are being made while the "test" is running. The developer can click "Save and Deploy" and more users see the new feature. The developer can continue doing this until 100% of the users are seeing the "experiment" meaning that 50% of my users are seeing the new feature. At this point, the new feature is ready to be deployed to all users. To do this, the developer stops the test by going to the "Launchpad" page and clicking "Stop Experiment."

Figure 6D:
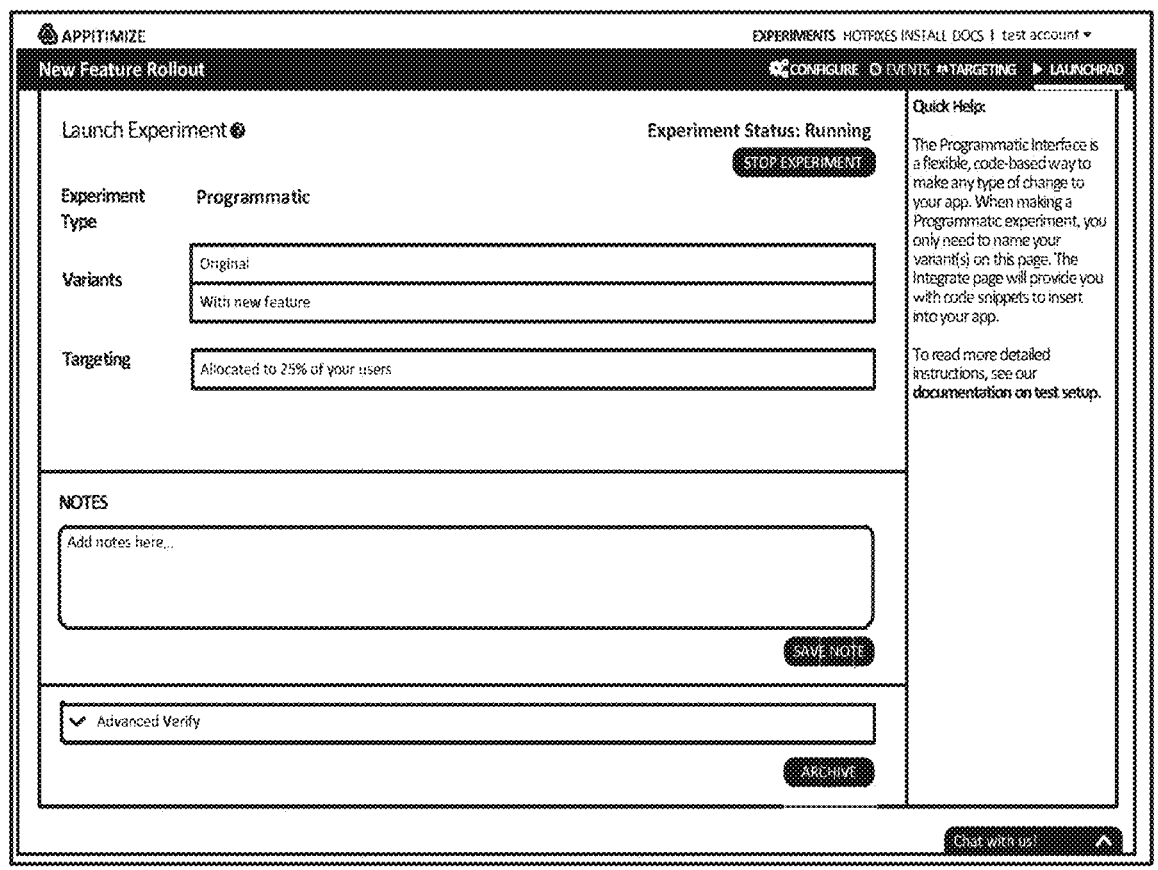

FIG. 6D illustrates an example graphical user interface that is provided to application developers depicting an example "Launchpad" page. From the "Launchpad" page, the developer can select "Show to All Users" next to the variant with my new feature. The new feature has been gradually and now all of the users are safely using the new feature. If the developer notices a crash or any usability issues anytime along the way, the developer can immediately stop the experiment and all of the users would have reverted to the original version of the app without the new feature. The developer can safely work on improving the feature to roll out again in the next release while the users continued to use the old version of the app without the feature.

Figure 6E:
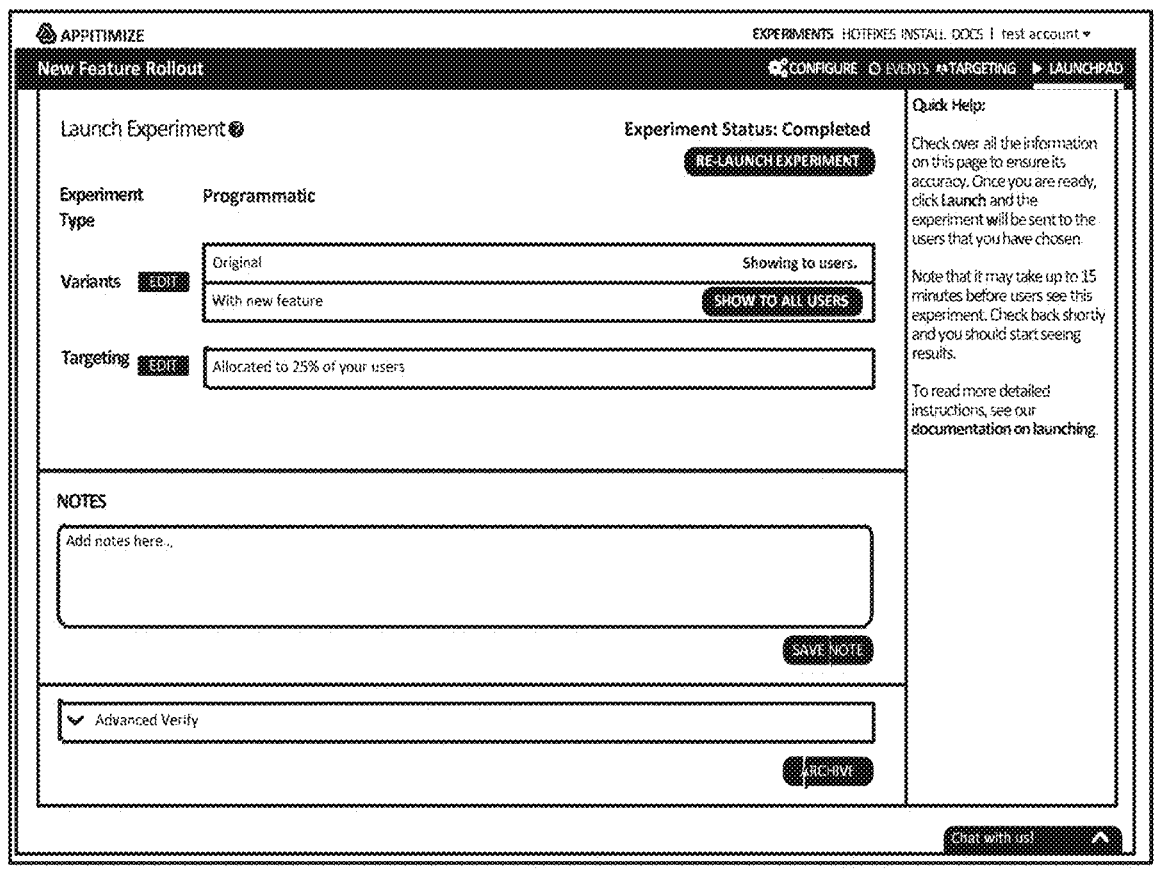

FIG. 6E illustrates an example graphical user interface that is provided to application developers depicting an example "Launchpad" page. If a developer notices a problem after the new feature is deployed to all of the users, the developer can easily undo the feature by clicking "Show to All Users" on the "Launchpad" page for the original variant (or version without the feature enabled).

Figure 6F:
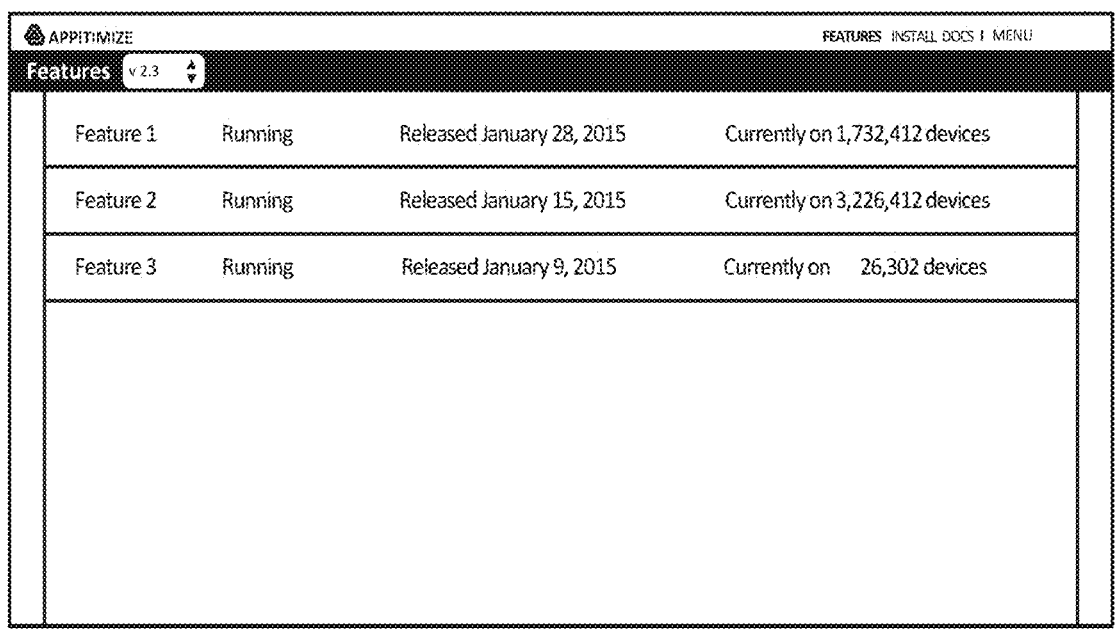
Figure 6G:
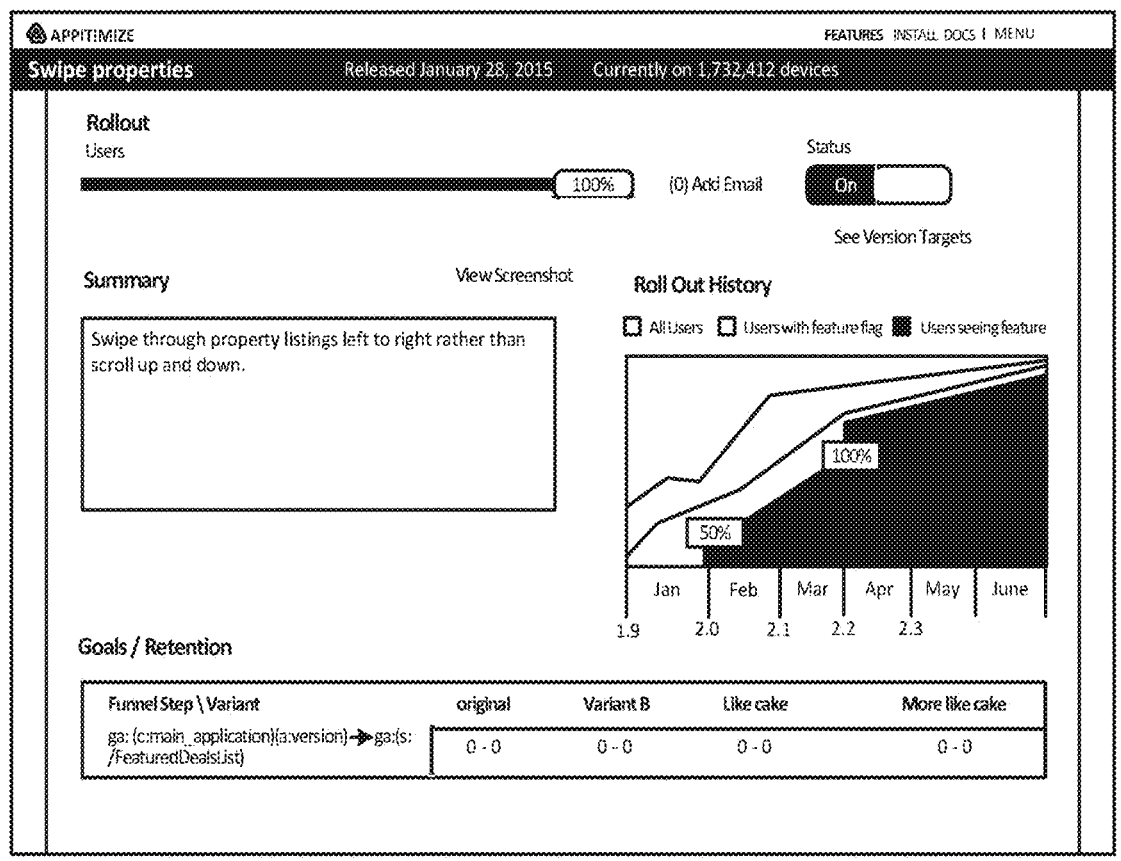

FIGS. 6F and 6G illustrate example graphical user interfaces that are provided to application developers for determining status and history of roll out for particular features. As discussed herein, rollout history, goals/retention, etc. can be provided and displayed graphically to the developers.

The functional block diagrams, operational scenarios and sequences, and flow diagrams provided in the Figures are representative of example systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A system comprising:
   a processor; and a computer-readable storage media having code instructions stored thereon which, when executed by the processor cause the processor to:
   monitor execution of a native application installed on a client computing device, the native application comprising one or more functions of an embedded test feature that is part of native code of the native application, the embedded test feature switchable among a plurality of states, the plurality of states comprising a first state and a second state;
   cause, responsive to a first event that triggers the embedded test feature of the native application, the native application to execute the embedded test feature in the first state using first data that is included in the embedded test feature;
   receive, from a developer computing device via a feature dashboard, a request to switch the embedded test feature from the first state of the embedded test feature executed using the first data to the second state of the embedded test feature executed using second data, the request including the second data;
   provide a manifest to the client computing device, the manifest including an instruction to switch the embedded test feature from the first state to the second state responsive to the first event that triggers the embedded test feature, the manifest including the second data for replacing the first data, wherein the native application processes the manifest to switch the first state of the embedded test feature of the native application to the second state;

monitor execution of program instructions associated with the native application for occurrence of a second event that triggers the embedded test feature of the native application; and cause, responsive to the second event, the native application to replace the first data that is included in the embedded test feature with the second data that is included in the manifest, and wherein the native application executes the embedded test feature in the second state using the second data.

2. The system of claim 1, wherein the instructions further cause the processor to:

receive feedback information from a plurality of client computing devices executing the native application; and identify, using the feedback information, a set of client computing devices from the plurality of client computing devices to provide the manifest, the set of client computing devices including the client computing device.

3. The system of claim 2, wherein the instructions further cause the processor to:

generate, based on the monitoring, tracking data describing execution of the native application by the set of client computing devices; and providing the tracking data to the developer computing device.

4. The system of claim 1, wherein the first event that triggers the embedded test feature comprises a function call.

5. The system of claim 1, wherein the instructions further cause the processor to:

responsive to a launch of the native application on the client computing device, receive a request from the client computing device for the manifest.

6. The system of claim 1, wherein the instruction to switch the first state of the embedded test feature to the second state identifies one or more of a test state flag on the native application to be toggled, an instruction on the native application associated with the second state, or a data object on the native application associated with the test state.

7. The system of claim 1, wherein the second data that replaces the first data includes one or more of new objects, events, or actions for the embedded test feature.

8. The system of claim 1, wherein replacing the first data with the second data comprises a change to one or more of an image, a color, a call to action, or a layout.

9. The system of claim 1, wherein the embedded test feature comprises a dynamic variable or a code block.

10. The system of claim 1, wherein an object code of the native application is unmodified in the switch from the first state of the embedded test feature to the second state.

11. The system of claim 1, wherein the native application includes an embedded control module that comprises a software development kit (SDK).

12. A method of dynamically enabling test features in a native application executing on a client computing device by a server computer, the method comprising:

monitoring execution of a native application installed on a client computing device, the native application comprising one or more functions of an embedded test feature that is part of native code of the native application, the embedded test feature switchable among a plurality of states, the plurality of states comprising a first state and a second state;

causing, responsive to a first event that triggers the embedded test feature of the native application, the native application to execute the embedded test feature in the first state using first data that is included in the embedded test feature;

receiving, from a developer computing device via a feature dashboard, a request to switch the embedded test feature from the first state of the embedded test feature executed using the first data to the second state of the embedded test feature executed using second data, the request including the second data;

providing a manifest to the client computing device, the manifest including an instruction to switch the embedded test feature from the first state to the second state responsive to the first event that triggers the embedded test feature, the manifest including the second data for replacing the first data, wherein the native application processes the manifest to switch the first state of the embedded test feature of the native application to the second state;

monitoring execution of program instructions associated with the native application for occurrence of a second event that triggers the embedded test feature of the native application; and causing, responsive to the second event, the native application to replace the first data that is included in the embedded test feature with the second data that is included in the manifest, and wherein the native application executes the embedded test feature in the second state using the second data.

13. The method of claim 12, wherein the method further comprises:

identifying feedback information from a plurality of client computing devices executing the native application; and identifying, using the feedback information, a set of client computing devices from the plurality of client computing devices to provide the manifest, the set of client computing devices including the client computing device.

14. The method of claim 13, wherein the method further comprises:

generating, based on the monitoring, tracking data describing execution of the native application by the set of client computing devices; and providing the tracking data to the developer computing device.

15. The method of claim 12, wherein the first event that triggers the embedded test feature comprises a function call.

16. The method of claim 12, wherein the method further comprises:

responsive to a launch of the native application on the client computing device, receiving a request from the client computing device for the manifest.

17. The method of claim 12, wherein the instruction to switch the first state of the embedded test feature to the second state identifies one or more of a test state flag on the native application to be toggled, an instruction on the native application associated with the second state, or a data object on the native application associated with the test state.

18. The method of claim 12, wherein the second data that replaces the first data includes one or more of new objects, events, or actions for the embedded test feature.

19. The method of claim 12, wherein the embedded test feature comprises a dynamic variable or a code block.

20. The method of claim 12, wherein an object code of the native application is unmodified in the switch from the first state of the embedded test feature to the second state.

\* \* \* \* \*

UNITED STATES PATENT AND TRADEMARK OFFICE
CERTIFICATE OF CORRECTION

PATENT NO. : 11,645,196 B2
APPLICATION NO. : 17/343714
DATED : May 9, 2023
INVENTOR(S) : DiTullio et al.

It is certified that error appears in the above-identified patent and that said Letters Patent is hereby corrected as shown below:

On the Title Page

Item [56] in Column 2, Line 1, delete "retriecved" and insert -- retrieved --, therefor.

Item [56] in Column 2, Line 2, delete "Maching" and insert -- Machine --, therefor.

In the Claims

In Column 16, in Claim 13, Line 35, delete "identifying" and insert -- receiving --, therefor.

Signed and Sealed this
Twenty-eighth Day of November, 2023

Katherine Kelly Vidal
*Director of the United States Patent and Trademark Office*